United States Patent [19]

Chezem

[11] Patent Number: 5,090,287
[45] Date of Patent: Feb. 25, 1992

[54] CIRCULAR TOOL ASSEMBLY

[76] Inventor: Jim A. Chezem, 2307 Kara Dr., Tallahassee, Fla. 32303

[21] Appl. No.: 644,385

[22] Filed: Jan. 22, 1991

[51] Int. Cl.$^5$ .............................................. B27B 33/08
[52] U.S. Cl. ....................................... 83/838; 83/835; 30/347; 144/231
[58] Field of Search .................... 83/835, 838, 840; 144/218, 222, 231; 30/276, 347

[56] References Cited

U.S. PATENT DOCUMENTS

| | | |
|---|---|---|
| 635,509 | 10/1899 | Rowe et al. |
| 869,574 | 10/1907 | Huther ................................. 83/838 |
| 2,022,433 | 11/1935 | Roemer ................................ 83/838 |
| 2,167,744 | 8/1939 | Cosby et al. |
| 2,958,348 | 11/1960 | Bueneman ........................... 83/838 |
| 3,067,791 | 12/1962 | Boyce .................................. 30/347 |
| 3,425,467 | 2/1969 | Willis ................................... 83/839 |
| 4,627,322 | 12/1986 | Hayhurst, Jr. ....................... 83/838 |
| 4,744,148 | 5/1988 | Brown ................................. 83/839 |
| 4,881,438 | 11/1989 | Pinney ................................. 83/835 |

FOREIGN PATENT DOCUMENTS 3635308 6/1988 Fed. Rep. of Germany ........ 83/838
0876334 10/1981 U.S.S.R. ............................... 83/838

OTHER PUBLICATIONS

"Arbortech Woodcarver" Brochure by Arbortech Pty. Ltd., Western Australia, publication date not known.

Primary Examiner—Hien H. Phan
Attorney, Agent, or Firm—Donald A. Kettlestrings

[57] ABSTRACT

A circular tool assembly adapted to be fitted together and secured on a power-driven tool arbor includes first and second circular discs, the discs defining a medial arbor-receiving opening and peripheral portions. At least one of the discs defines an outer convex surface extending continuously between the medial opening and the peripheral portion, and the disc further defines an inner, concave surface extending continuously between the medial opening and the peripheral portion. The discs are adapted to be positioned on the arbor of the tool with a circular tool element, such as a chain saw circlet, positioned between and engaged by the peripheral portions of the discs to hold the element in position between the discs when the discs are forced toward each other along the arbor to tightly hold the tool element between the peripheral portions of the discs.

18 Claims, 4 Drawing Sheets

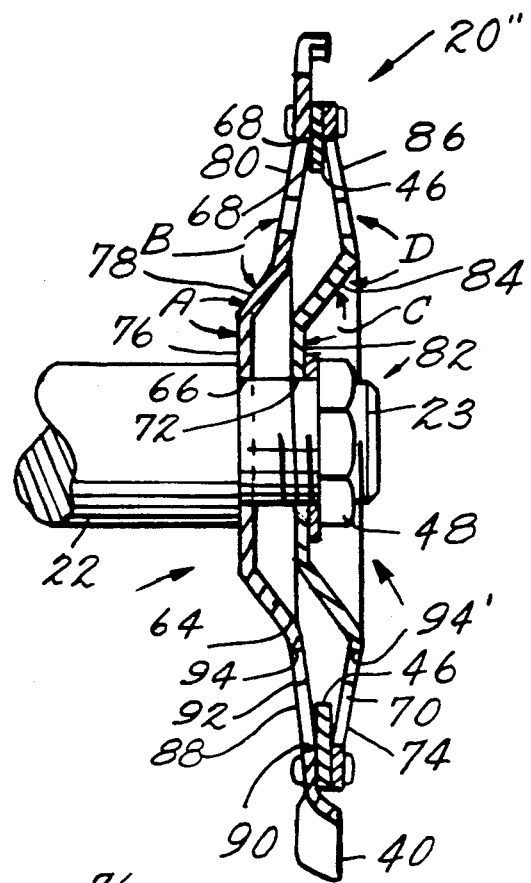
Fig. 10.
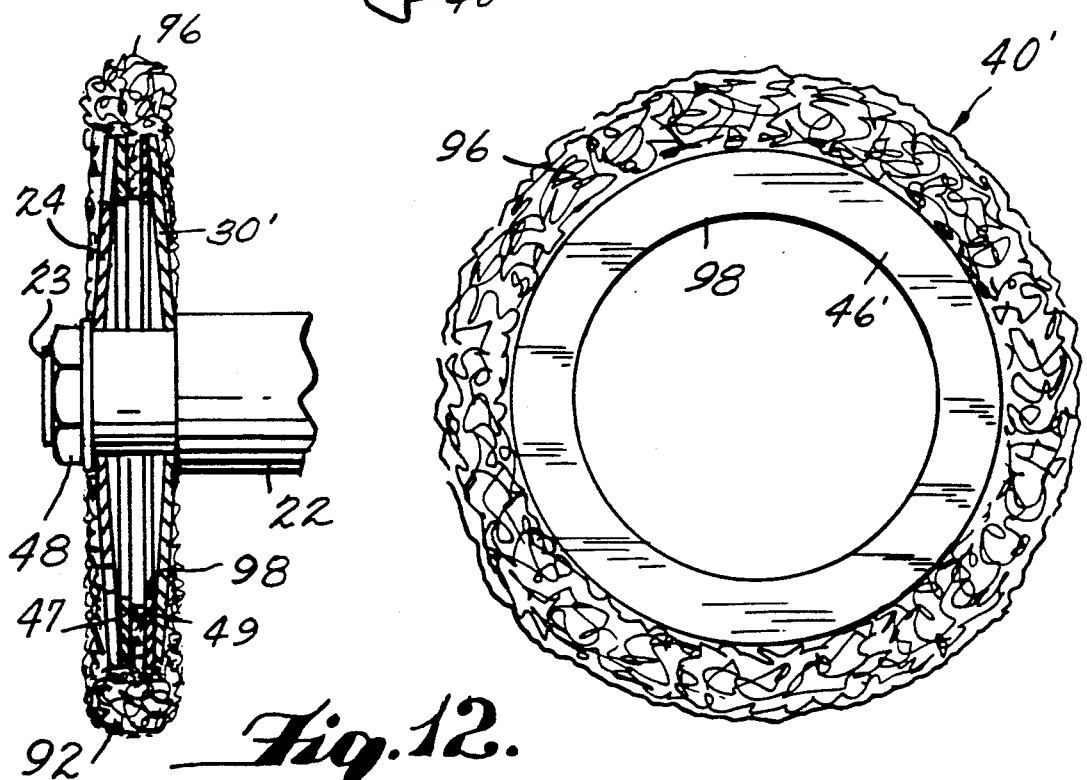
Fig. 11.
Fig. 12.

CIRCULAR TOOL ASSEMBLY

This invention relates to a circular tool assembly and more particularly to such an assembly having a detachable circular tool element tightly held between peripheral portions of first and second circular discs of the assembly. The discs are optimally shaped to enable large compressive forces to be applied to the discs for firmly and safely holding the tool element in position between the discs during high speed operation of the tool assembly by a power-driven tool.

Various types of circular saw blade assemblies are known which use two opposing discs to hold a chain saw circlet between the discs. Although such assemblies have served the purpose, they have not proved entirely satisfactory under all conditions of service. Vibrations caused by high speed impacting of the chain saw circlet cutters with the material being cut can cause electrospot welds and rivets/screws to fail in their functions to keep the two opposing discs held together. Also, the configurations of the discs of presently known tool assemblies do not enable maximum compressive forces to be applied to the tool element held between the discs, and the danger exists of separation of the tool element from the discs during high speed operation. Failure to hold the opposing discs together during high speed operation creates an extremely dangerous situation, and it is important that the opposing discs be firmly and securely held together in a fail-safe manner during the high speed operation of the tool assembly.

It is, therefore, an object of the present invention to provide a circular tool assembly wherein opposing circular discs are optimally shaped to firmly and safely hold a circular tool element in position between the discs to prevent separation of the assembly during high speed operation.

Another object is to provide a circular tool assembly wherein opposing circular discs are shaped to enable the discs to firmly and safely grip a circular tool element between the discs on the arbor of a power-driven tool by means of maximum compression and frictional forces.

A further object of the invention is the provision of a circular tool assembly which will accommodate a variety of different types of circular tool elements to be firmly and safely held between opposing circular discs.

Still another object is to provide a circular tool assembly which is quick and easy to assemble and disassemble and which is safe to operate.

Another object is to provide a circular tool assembly wherein two opposing discs are optimally shaped to be compressed tightly together to firmly and safely hold a tool element between the discs with maximum compression and frictional force.

Another object is to provide a circular tool assembly which can be quickly and easily removed from the arbor of a power-driven tool and replaced by another circular tool assembly for a different specific function, such as cutting, wire brushing, buffing, sanding, polishing and so forth.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects the present invention provides a circular tool assembly to be fitted together and secured on the arbor or shaft of a power-driven tool to be rotated thereby, the assembly comprising a first circular disc defining a first medial, arbor-receiving opening and a first peripheral portion; a second circular disc defining a second medial, arbor-receiving opening and a second peripheral portion; the first disc further defining a first outer, convex surface extending continuously between the first opening and the first peripheral portion, and the first disc further defining a first inner, concave surface extending continuously between the first opening and the first peripheral opening, the discs adapted to be positioned on the arbor with the inner surface adjacent to and facing toward the second disc; and a circular tool element, such as a chain saw circlet, adapted to extend about outer perimeters of the discs and including at least one flange member adapted to be positioned between and engaged by the peripheral portions of the discs to hold the element in position between the discs when the discs are forced toward each other along the arbor to tightly hold the flange member or members between the peripheral portions of the discs.

Each of the discs is of substantially uniform thickness, and each of the discs defines a plurality of radial slots extending inwardly from the outer perimeter of each disc and a plurality of rounded openings are located within each disc in communication with innermost ends of each of the slots. The radial slots and rounded openings in the discs permit the discs to be compressed toward each other with maximum force to firmly hold the circular tool element in position between the discs without rippling or wrinkling the peripheral portions of the discs. The slots and circular openings also provide for cooling of the tool assembly during operation of the assembly as air passes over and around the slots and circular openings.

It is to be understood that both the foregoing general description and the following detailed description are exemplary and explanatory but are not restrictive of the invention.

The accompanying drawings, which are incorporated in and constitute a part of this specification, illustrate examples of preferred embodiments of the invention and, together with the description, serve to explain the principles of the invention.

FIG. 8 is an end view, partly in section, showing the assembly embodiment of FIG. 5 mounted on the arbor or shaft of a power-driven tool;

FIG. 9 is a side elevation view of still another embodiment of a tool assembly wherein both discs are stepped or offset in configuration;

FIG. 10 is an end view, partly in section, showing the assembly embodiment of FIG. 9 mounted on the arbor or shaft of a power-driven tool;

FIG. 11 is a side elevation view of a circular tool element in accordance with the invention; and FIG. 12 is an end view, partly in section, showing the tool element of FIG. 11 assembled between the discs shown in FIG. 6.

Figure 1:
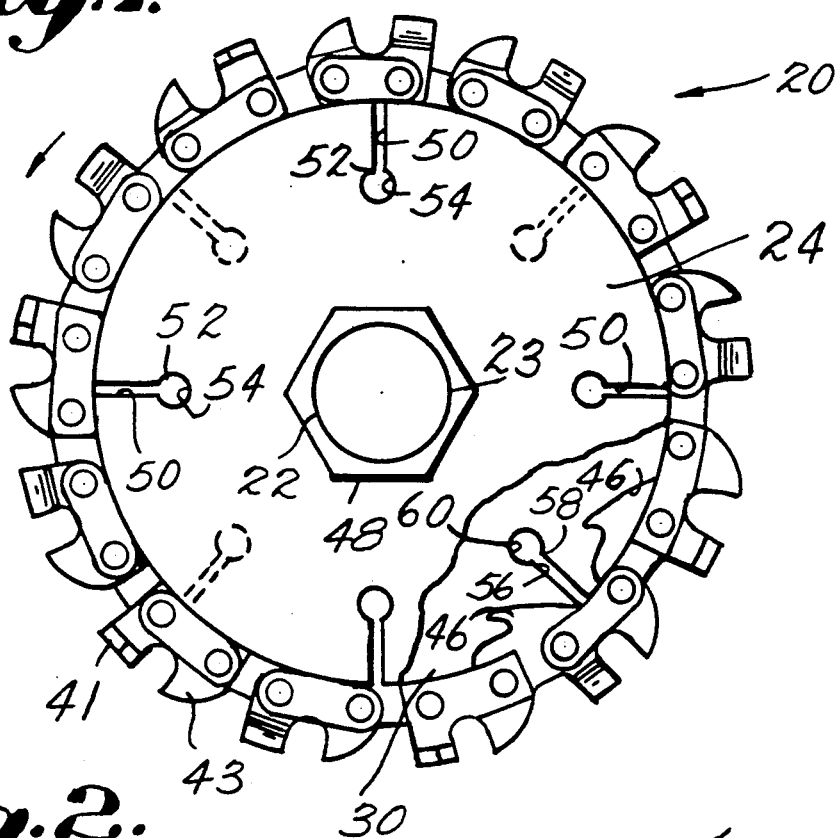
FIG. 1 is a partially fragmentary side elevation view of one embodiment of a mounted tool assembly in accordance with this invention wherein one disc is substantially flat and the other disc is convex/concave in shape.
Figure 2:
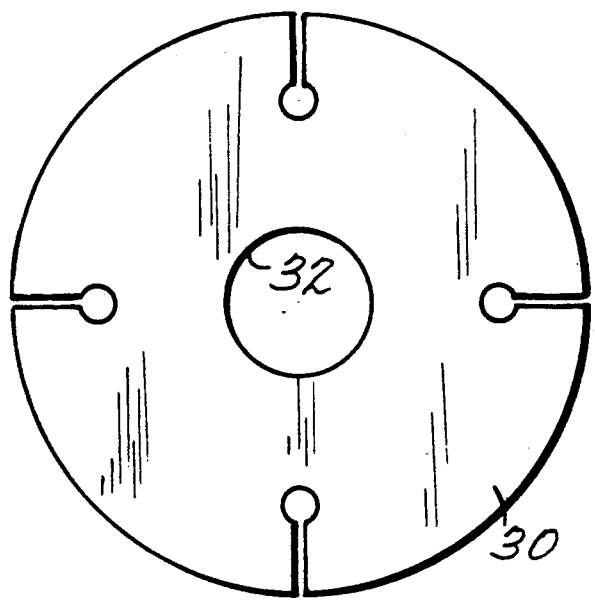
FIG. 2 is a side elevation view of the flat disc in the embodiment of FIG. 1.
Figure 3:
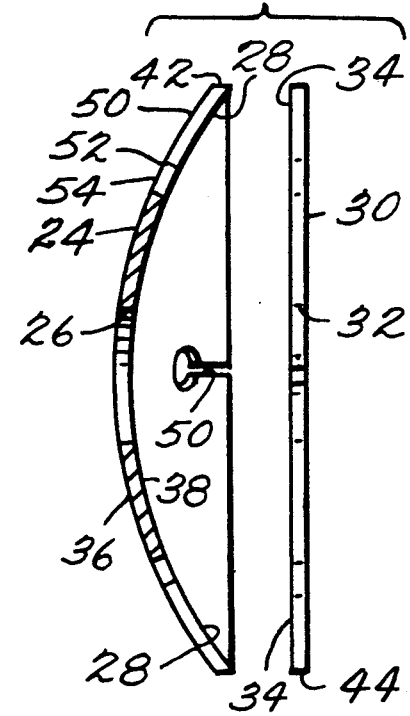
FIG. 3 is an end elevation view of the flat disc in the embodiment of FIG. 1 and showing the convex/concave disc in section taken through the center of the convex/concave disc.
Figure 4:
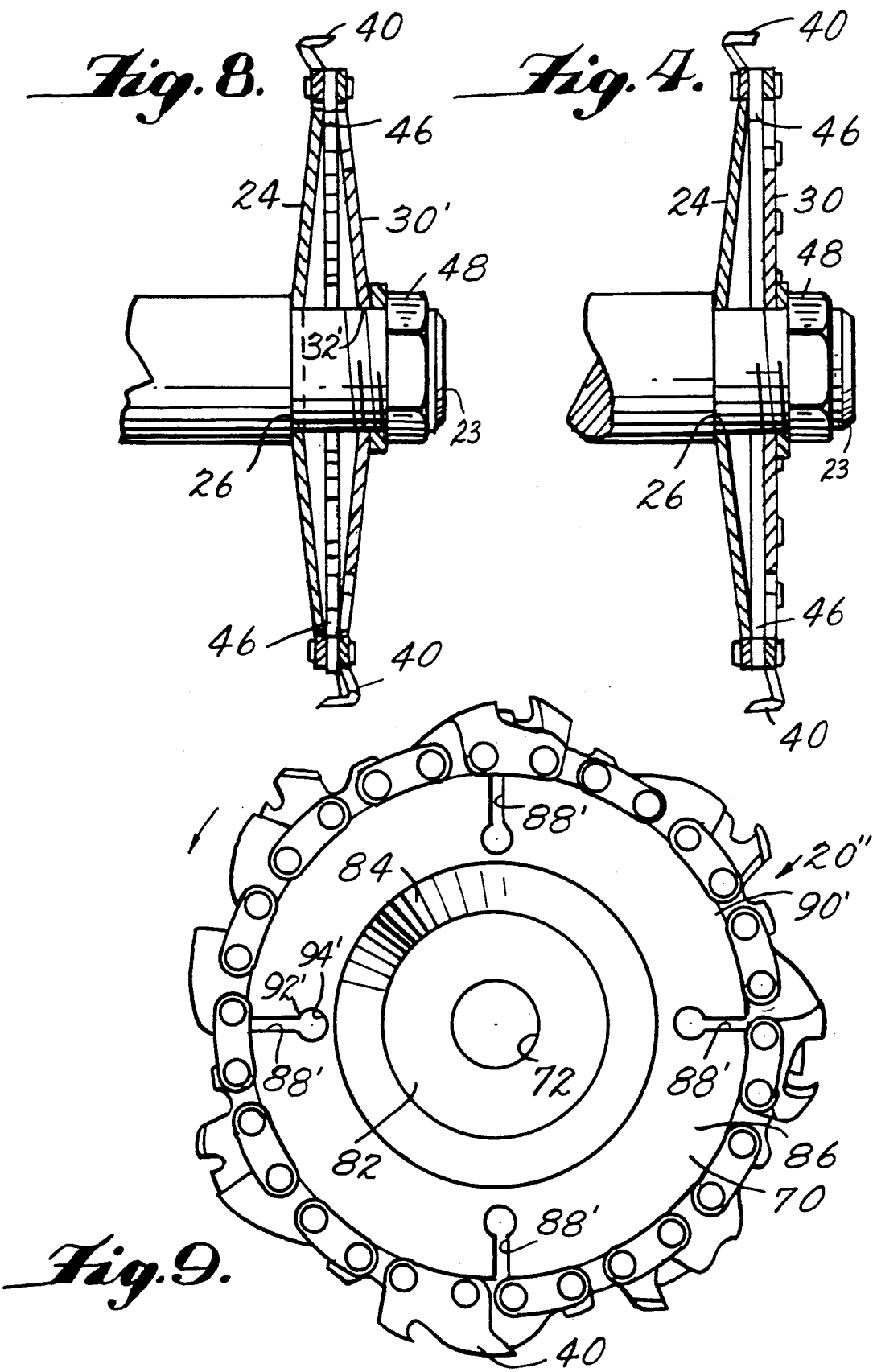
FIG. 4 is an end view, partly in section, showing the assembly embodiment of FIG. 1 mounted on the arbor or shaft of a power-driven tool.
Figure 5:
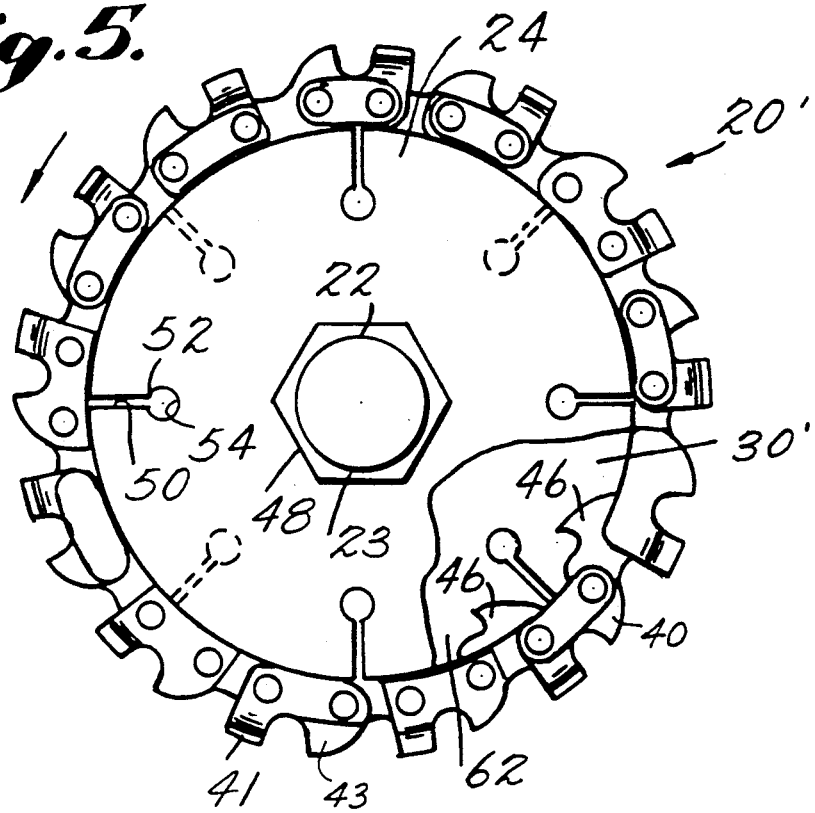
FIG. 5 is a partially fragmentary side elevation view of another embodiment of a mounted tool assembly wherein both discs are convex/concave in shape.
Figure 6:
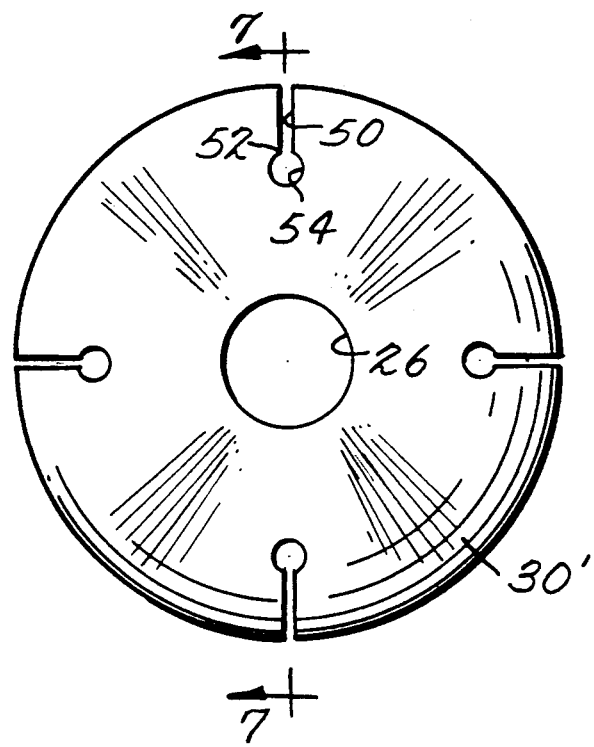
FIG. 6 is a side elevation view of a convex/concave disc in the embodiment of FIG. 5.

With reference now to the drawings, wherein like reference characters designate like or corresponding parts throughout the several views, there is shown in FIGS. 1-4 a circular tool assembly 20 to be fitted together and secured on a power-driven arbor or shaft 22 of a power-driven tool.

As shown in FIGS. 1-4, tool assembly 20 includes a first circular disc 24 defining a first medial, arbor-receiving opening 26 and a first peripheral portion 28. Assembly 20 further includes a second circular disc 30 defining a second medial, arbor-receiving opening 32 and a second peripheral portion 34.

In the embodiment illustrated in FIGS. 1-4, disc 30 is substantially flat. First disc 24 defines a first outer, convex surface 36 which extends continuously between opening 26 and peripheral portion 28. Disc 24 further defines a first inner, concave surface 38 which extends continuously between opening 26 and peripheral portion 28, and discs 24, 30 are positioned on arbor 22 with inner surface 38 adjacent to and facing toward disc 30.

A circular tool element 40, such as a chain saw circlet having cutters 41 and rakers 43, extends about outer perimeters 42, 44 of discs 24, 30, respectively, and tool element 40 includes a plurality of flange members or tangs 46. Flange members 46 are positioned between and engaged by peripheral portions 28, 34 of the discs to firmly and safely hold element 40 in position between the discs when the discs are forced toward each other along arbor 22 by tightening nut 48 on the arbor. As a result, flange members 46 are tightly grasped and held between peripheral portions 28, 34 of the discs, to prevent any slippage or movement of the circlet inside discs 24, 30.

In accordance with the invention, each of discs 24, 30 are of substantially uniform thickness throughout and with respect to each other. First disc 24 defines a first plurality of radial slots 50 which extend inwardly from outer perimeter 42, and slots 50 define innermost ends 52. Disc 24 further defines a first plurality of rounded openings 54 in communication with innermost ends 52, respectively.

Second disc 30 also defines a second plurality of radial slots 56 which extend inwardly from outer perimeter 44 and which define innermost ends 58. Disc 30 further defines a second plurality of rounded openings 60 in communication with innermost ends 58, respectively.

In the assembly and operation of the invention embodiment shown in FIGS. 1-4, circular tool element 40, such as a chain saw circlet, is positioned between discs 24, 30 with flange members 46 of tool element 40 positioned between and engaging peripheral portions 28, 34 of the discs. Discs 24, 30 and circular tool element 40 are then positioned on arbor 22 of the power-driven tool by passing arbor 22 through openings 26, 32 of the discs. End 23 of the arbor is threaded, and nut 48 is threaded onto end 23. Nut 48 is further threadably tightened onto threaded end 23 of arbor 22 until disc 24 is partially deformed and flattened so as to cause flange members 46 to be tightly and safely held between peripheral portions 28, 34 of the discs. The convex/concave shape of disc 24 enables large compressive forces to be exerted on flange members 46 as disc 24 is flattened or deformed by the tightening action of nut 48. The nut and threaded arbor is only one method of tightening and compressing the discs together. The discs are not limited to this specific arrangement for securing the circlet to the power tool and for compressing the circlet between discs 24, 30.

Radial slots 50 and rounded openings 54 within disc 24 allow for ripple/wrinkle free deformation of peripheral portion 28 of disc 24 as the disc is compressed by the action of nut 48. Slots 50, 56 and rounded openings 54, 60 within the discs also permit cooling of tool assembly 20 during high speed operation of the assembly by the power-driven tool.

Another embodiment of the invention is illustrated in FIGS. 5-8. In this embodiment, second disc 30', instead of being flat, is shaped substantially identically to disc 24. As illustrated in FIGS. 5-8, disc 30' defines an outer, convex surface 36' which extends continuously between arbor-receiving opening 32' and peripheral portion 34'. Disc 30' further defines an inner, concave surface 62 which extends continuously between opening 32' and peripheral portion 34'. Discs 24, 30' are positioned on arbor 22 with surfaces 38 and 62 adjacent to and facing toward each other.

Figure 7:
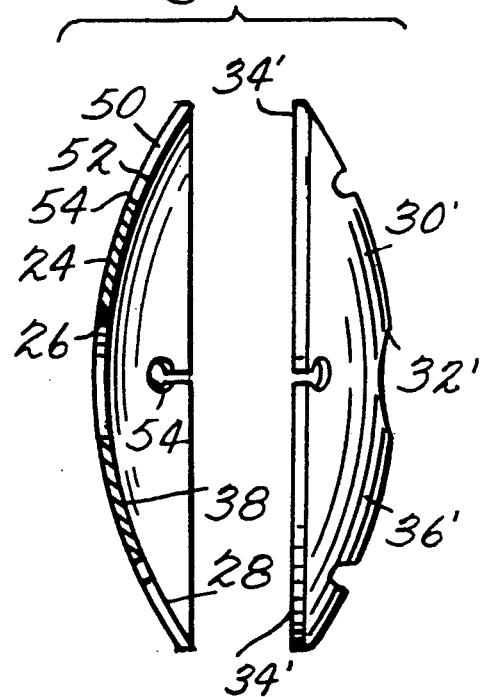
FIG. 7 is an end elevation view of one of the convex/concave discs in the embodiment of FIG. 5 and showing the other convex/concave disc in section taken along the line 7—7 in FIG. 6 and looking in the direction of the arrows.

Discs 24, 30' are each of substantially uniform thickness throughout and with respect to each other. Disc 30' defines a plurality of radial slots and rounded openings in the same configuration as previously described with respect to disc 24. This is best shown in FIG. 7.

In the assembly and operation of the embodiment shown in FIGS. 5-8, circular tool element 40 is positioned between discs 24, 30' with flange members 46 positioned between peripheral portions 28, 34' Discs 24, 30' and tool element 40 are then placed onto arbor 22 with arbor 22 extending through openings 26, 32' of the discs. Nut 48 is then threadably tightened onto end 23 of arbor 22 to cause compression of discs 24, 30'. The compression of the discs causes flange members 46 to be tightly and safely held between peripheral portions 28, 34' of the discs for safe operation of the tool assembly by the power-driven tool. The convex/concave shapes of discs 24, 30' enable large compressive forces to be exerted on flange members 46 as discs 24, 30' are flattened or deformed by the tightening action of nut 48.

As described with respect to the previous embodiment, the radial slots and rounded openings within discs 24, 30' allow for ripple/wrinkle free deformation of the material within the peripheral portions of the discs during compression of the discs by tightening of nut 48. In addition, the radial slots and rounded openings within discs 24, 30' allow for cooling of the discs and of tool assembly 20' during high speed operation of the assembly by the power-driven tool.

Another embodiment of the invention is illustrated in FIGS. 9-10. In this embodiment, the discs are stepped or offset to position tool element 40 a desired distance away from the housing of the power-driven tool.

More specifically, circular tool assembly 20", as illustrated in FIGS. 9-10, includes a first circular disc 64 which defines a first medial, arbor-receiving opening 66 and a first peripheral portion 68. A second circular disc 70 defines a second medial, arbor-receiving opening 72 and a second peripheral portion 74.

First disc 64 defines a first outer, substantially flat surface 76 which extends around and a predetermined distance from opening 66. Disc 64 further defines a second outer, substantially flat surface 78 which extends around and a predetermined distance from surface 76, and surface 78 defines an angle A greater than one hundred eighty degrees and less than two hundred seventy degrees with respect to outer surface 76. This is best shown in FIG. 10. Disc 64 further defines a third outer, substantially flat surface 80 which extends between surface 78 and peripheral portion 68, and surface 80 defines an obtuse angle B with respect to surface 78.

Second disc 70 defines a fourth outer, substantially flat surface 82 which extends around and a predetermined distance from opening 72. A fifth outer, substantially flat surface 84 extends around and a predetermined distance from surface 82, and surface 84 defines an obtuse angle C with respect to surface 82. Disc 70 further defines a sixth outer, substantially flat surface 86 which extends between surface 84 and peripheral portion 74, and surface 86 defines an angle D greater than one hundred eighty degrees but less than two hundred seventy degrees with respect to surface 84.

Each of discs 64, 70 is of substantially uniform thickness throughout and with respect to each other. Disc 64 defines a first plurality of radial slots 88 which extend inwardly from outer perimeter 90 of the disc, and each of radial slots 88 defines an innermost end 92. Disc 64 further defines a first plurality of rounded openings 94 in communication with innermost ends 92, respectively.

Similarly, second disc 70 defines a second plurality of radial slots 88' which extend inwardly from outer perimeter 90' of disc 70, and slots 88' define innermost ends 92'. Disc 70 further defines a second plurality of rounded openings 94' in communication with innermost ends 92', respectively.

In assembly and operation of the embodiment shown in FIGS. 9-10, tool element 40 is positioned between discs 64, 70 with flange members 46 located between peripheral portions 68, 74 of the discs. The discs are also positioned with outer surfaces 76, 82 facing away from each other. The discs and tool element 40 are then placed onto arbor 22 with arbor 22 extending through openings 66, 72 of the discs. As previously described with respect to the preceding embodiments, nut 48 is then tightened onto threaded end 23 of arbor 22 so that the nut engages surface 82 of disc 70. The nut is then tightened further to force discs 64, 70 tightly together so that flange members 46 are tightly and safely held between peripheral portions 68, 74 of the discs. The configurations of discs 64, 70 and the orientation of surfaces 80, 86 with respect to each other enable large compressive forces to be exerted on flange members 46 as surfaces 80, 86 are flattened or deformed by the forcing together of discs 64, 70 as nut 48 is tightened.

The unique configuration of discs 64, 70 permits the discs to be flattened or deformed about their peripheral portions to tightly engage and hold tool element 40, and the radial slots and rounded openings within the discs enables ripple/wrinkle free deformation of the material adjacent to the peripheral portions of the discs. As a result, the discs can be tightly compressed together to firmly hold the tool element in a safe and secure position between the discs during the high speed operation of assembly 20". In addition, the radial slots and rounded openings within discs 64, 70 allow for cooling of the discs and of the tool assembly 20" during high speed operation of the assembly by the power-driven tool. The stepped configuration of discs 64, 70 permits automatic positioning of tool element 40 a safe and convenient distance away from the housing or other elements of the power-driven tool when the assembly is mounted on arbor 22.

Another important feature and embodiment of this invention is illustrated in FIGS. 11 and 12. This invention contemplates the use of various types of tool elements 40', in addition to chain saw circlet 40. As shown in FIGS. 11 and 12, tool element 40' may include a circular working member 96, and flange member 46' is attached to working member 96 and defines a medial, arbor-receiving opening 98 therein. Flange member 46' is substantially flat to facilitate positioning of flange member 46' between the peripheral portions of the discs of the invention. In the specific embodiment shown in FIGS. 11 and 12, flange member 46' includes first and second flat, ring-shaped elements 47, 49 which are connected together by adhesive or other conventional attaching elements (not shown). Working member 96 is positioned and compressively held between elements 47, 49, and portions of member 96 project beyond outer perimeters of elements 47, 49. Working member 96 can be any of a number of different configurations including a wire brush buffer, sander, polisher, cutter and so forth for carving, cutting, shaping, abrading, sanding, polishing or buffing wood, plastic or other materials.

This invention provides for a safe and versatile tool assembly which can be quickly and easily adapted for use with various types of tool elements to perform a variety of types of operations on a variety of materials. The assembly discs are preferably made of steel or other strong material and the discs are shaped to allow the discs to be compressed and deformed to exert large forces on a tool member held between the discs. The shapes of the discs enable large compressive, spring-like forces created by flexing of the discs to be exerted to firmly and safely hold a tool member between the discs.

The invention in its broader aspects is not limited to the specific details shown and described, and departures may be made from such details without departing from the principles of the invention and without sacrificing its chief advantages.

What is claimed is:

1. A circular tool assembly to be fitted together and secured on a power-driven arbor to be rotated, thereby; said assembly comprising:

a first circular disc defining a first medial, arbor-receiving opening and a first peripheral portion;

a second circular disc defining a second medial, arbor-receiving opening and a second peripheral portion;

said first disc further defining a first outer, convex surface extending continuously between said first opening and said first peripheral portion, and said first disc further defining a first inner, concave surface extending continuously between said first opening and said first peripheral portion, said discs adapted to be positioned on said arbor with said, inner surface adjacent to and facing toward said second disc; and a circular tool element, such as a chain saw circlet, adapted to extend about outer perimeters of said discs and including at least one flange member adapted to be positioned between and engaged by said peripheral portions to hold said element in position between said discs when said discs are forced toward each other along said arbor to tightly hold said flange member between said peripheral portions of said discs.

2. A circular tool element for use with the circular tool assembly of claim 1, said tool element comprising:

circularly positioned working members; and said flange member attached to said working members and defining a third medial, arbor-receiving opening therein and sized to fit between and be engaged by said peripheral portions of said discs.

3. A tool element as in claim 2 wherein said flange member comprises first and second ring-shaped, substantially flat elements;

means in operative relationship with said ring-shaped elements for connecting said ring-shaped elements together; and said working members positioned and held between said ring-shaped elements and projecting beyond outer perimeters of said ring-shaped elements.

4. A tool element as in claim 3 wherein said flange member is substantially flat.

5. A circular tool assembly secured on a power-driven arbor to be rotated thereby, said assembly comprising:

a first circular disc defining a first medial, arbor-receiving opening and a first peripheral portion;

a second circular disc defining a second medial, arbor-receiving opening and a second peripheral portion;

said first disc further defining a first outer, convex surface extending continuously between said first opening and said first peripheral portion, and said first disc further defining a first inner, concave surface extending continuously between said first opening and said first peripheral portion, said disc positioned on said arbor with said inner surface adjacent to and facing toward said second disc;

a circular tool element, such as a chain saw circlet, extending about outer perimeters of said discs and including at least one flange member positioned between and engaged by said peripheral portions to hold said element in position between said discs; and means in operative relationship with said arbor and with said discs for forcing said discs toward each other to tightly hold said flange member between said, peripheral portions of said discs.

6. An assembly as in claim 5 wherein said discs are each of substantially uniform thickness.

7. An assembly as in claim 6 wherein said first disc defines a first plurality of radial slots extending inwardly from the outer perimeter of said first disc and defining innermost ends, and wherein said first disc further defines a first plurality of rounded openings in communication with said innermost ends of said slots, respectively.

8. An assembly as in claim 7 wherein said second disc defines a second plurality of radial slots extending inwardly from the outer perimeter of said second disc and defining innermost ends, and wherein said second disc further defines a second plurality of rounded openings in communication with said innermost ends of said second plurality of slots, respectively.

9. An assembly as in claim 5 wherein said second disc further defines a second outer, convex surface extending continuously between said second opening and said second peripheral portion, and said second disc further defining a second inner, concave surface extending continuously between said second opening and said second peripheral portion, said discs positioned on said arbor with said inner, concave surfaces adjacent to and facing toward each other.

10. An assembly as in claim 7 wherein said discs are each of substantially uniform thickness.

11. An assembly as in claim 10 wherein said first disc defines a first plurality of radial slots extending inwardly from the outer perimeter of said first disc and defining innermost ends, and wherein said first disc further defines a first plurality of rounded openings in communication with said innermost ends of said slots, respectively.

12. An assembly as in claim 11 wherein said second disc defines a second plurality of radial slots extending inwardly from the outer perimeter of said second disc and defining innermost ends, and wherein said second disc further defines a second plurality of rounded openings in communication with said innermost ends of said second plurality of slots, respectively.

13. A circular tool assembly to be fitted together and secured on a power-driven arbor to be rotated thereby, said assembly comprising:

a first circular disc defining a first medial, arbor-receiving opening and a first peripheral portion;

a second circular disc defining a second medial, arbor-receiving opening and a second peripheral portion;

said first disc further defining a first outer, substantially flat surface extending around and extending a predetermined distance from said first opening, a second outer, substantially flat surface extending around and extending a predetermined distance from said first outer surface and defining an angle greater than 180° and less than 270° with said first outer surface, and a third outer, substantially flat surface extending between said second outer surface and said first peripheral portion and defining an obtuse angle with said second outer surface;

said second disc further defining a fourth outer, substantially flat surface extending around and extending a predetermined distance from said second opening, a fifth outer, substantially flat surface extending around and extending a predetermined distance from said fourth outer surface and defining an obtuse angle with said fourth outer surface, and a sixth outer, substantially flat surface extending between said fifth outer surface and said second peripheral portion and defining an angle greater than 180° but less than 270° with said fifth outer surface; and a circular tool element, such as a chain saw circlet, adapted to extend about outer perimeters of said discs and including at least one flange member adapted to be positioned between and engaged by said peripheral portions to hold said element in position between said discs when said discs are forced toward each other along said arbor to tightly hold said flange member between said peripheral portions of said discs.

14. A circular tool assembly as in claim 13 wherein said discs are each of substantially uniform thickness.

15. A circular tool assembly secured on a power-driven arbor to be rotated thereby, said assembly comprising:
a first circular disc defining a first medial, arbor-receiving opening and a first peripheral portion;
a second circular disc defining a second medial, arbor-receiving opening and a second peripheral portion;
said first disc further defining a first outer, substantially flat surface extending around and extending a predetermined distance from said first opening, a second outer, substantially flat surface extending around and extending a predetermined distance from said first outer surface and defining an angle greater than 180° and less than 270° with said first outer surface, and a third outer, substantially flat surface extending between said second outer surface and said first peripheral portion and defining an obtuse angle with said second outer surface;
said second disc further defining a fourth outer, substantially flat surface extending around and extending a predetermined distance from said second opening, a fifth outer, substantially flat surface extending around and extending a predetermined distance from said fourth outer surface and defining an obtuse angle with said fourth outer surface, and a sixth outer, substantially flat surface extending between said fifth outer surface and said second peripheral portion and defining an angle greater than 180° but less than 270° with said fifth outer surface;
said discs positioned on said arbor with said outer surfaces of said respective discs facing away from each other;
a circular tool element, such as a saw chain circlet extending about outer perimeters of said discs and including at least one flange member positioned between and engaged by said peripheral portions to hold said element in position between said discs; and
means in operative relationship with said arbor and with said discs for forcing said discs toward each other to tightly hold said flange member between said peripheral portions of said discs.

16. An assembly as in claim 15 wherein said discs are each of substantially uniform thickness.

17. An assembly as in claim 16 wherein said first disc defines a first plurality of radial slots extending inwardly from the outer perimeter of said first disc and defining innermost ends, and wherein said disc further defines a first plurality of rounded openings in communication with said innermost ends of said slots, respectively.

18. An assembly as in claim 17 wherein said second disc defines a second plurality of radial slots extending inwardly from the outer perimeter of said second disc and defining innermost ends, and wherein said second disc further defines a second plurality of rounded openings in communication with said inner most ends of said second plurality of slots, respectively.

* * * * *